US000001442H

United States Statutory Invention Registration [19]

[11] Reg. Number: H1442

Edgerton et al. [43] Published: Jun. 6, 1995

[54] PETROLEUM COKING DRUM WITH SLUMP PREVENTERS

[76] Inventors: David M. Edgerton, 4024 Toad Lake Rd., Bellingham, Wash. 98226; Kip W. Miller, 1218 Front St.; Kerry L. Willis, 825 19th St., both of Lynden, Wash. 98264

[21] Appl. No.: 976,813

[22] Filed: Nov. 16, 1992

[51] Int. Cl.[6] ..... B01D 3/00; B01D 1/00

[52] U.S. Cl. ..... 196/125; 196/107; 196/133

[58] Field of Search ..... 196/130, 133, 122, 125; 202/121, 241, 252, 261, 222

[56] References Cited

U.S. PATENT DOCUMENTS

| | | | |
|---|---|---|---|
| 1,871,932 | 8/1932 | Watts et al. | 196/122 |
| 1,979,550 | 11/1934 | Huff | 196/122 |
| 1,980,218 | 11/1934 | Morrell | 196/122 |

*Primary Examiner*—Shean Wu
*Attorney, Agent, or Firm*—F. Lindsey Scott

[57] ABSTRACT

Petroleum coke slumping in a petroleum coking drum is reduced by the use of a petroleum coking drum comprising a) a generally cylindrical vessel having a principal diameter portion, an upper reduced diameter portion at an upper end of the vessel, an upper reducing diameter portion extending from a lower end of the upper reduced diameter portion to an upper end of the principal diameter portion, a lower reduced diameter portion at a lower end of the vessel and a lower reducing diameter portion extending from an upper end of the lower reduced diameter portion to a lower end of the principal diameter portion; b) a top head removably positionable to close the upper reduced diameter portion; c) a bottom head removably positionable to close the lower reduced diameter portion; and d) a plurality of restraining bars positioned around an inner circumference of the lower reduced diameter portion. Restraining bars may also be positioned on inner surfaces of the lower reducing diameter portion or on both the reducing diameter portion and the reduced diameter portion of the inner walls of the petroleum coking drum.

18 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PETROLEUM COKING DRUM WITH SLUMP PREVENTERS

BACKGROUND OF THE INVENTION

1. Field of the Invention

This invention relates to the production of petroleum coke and more specifically to an improvement in petroleum coking drums for reducing coke slumping during the coke removal process.

2. Background Art

Petroleum coke is generally produced commercially by charging a heavy petroleum residuum stream to a coking drum at an elevated temperature typically from about 900° F. to about 950° F. until the drum is filled and the heavy petroleum residuum has been converted to petroleum coke. As the coke forms in the coking drum, the heavy petroleum residuum is thermally cracked into lighter hydrocarbons, which are recovered for further processing, and petroleum coke, which is subsequently recovered from the coking drum by the use of high-pressure water jets which are used to drill the petroleum coke from the coke drum. The coke typically falls into the coke pit from which it is recovered and passed to coke storage and thereafter to coke calcining to produce calcined petroleum coke.

Such a process is shown in FIG. 1. In FIG. 1, a heavy petroleum residuum stream from a vacuum flasher or other refinery source is passed to a fractionator 10 through a line 12. In fractionator 10, the heavy petroleum residuum is topped to produce a suitable feed stock for a coking drum and then passed through a line 14 to a heater 20 where it is heated to a suitable temperature, typically about 900° F. to about 950° F., and then passed through a line 22, a valve 24 and a line 26 to a coking drum 30 where petroleum coke is produced. Valve 24 is used to direct the heavy petroleum residuum to one of two or more coke drums (30 and 32) which are used alternately so that one may be used at all times to receive heavy petroleum residuum while the other is being emptied and the like. After the coke drum has been filled to a desired level with petroleum coker the introduction of new feed is stopped and the feed is switched to coke drum 32. During the production of the petroleum coke, lighter hydrocarbon materials are formed and are recovered through a line 34, passed through a valve 40, a line 42, a valve 46 and a line 48 to fractionator 10. A plurality of hydrocarbon streams and water may be recovered from fractionator 10 through lines 64, 66, 68 and 70. Normally, the products recovered from fractionator 10 are not finished refinery products but are fractions which are passed to further processing. Similarly, the water stream recovered from fractionator 10 at certain intervals during the operation of the coking drums may be mixed with light hydrocarbons which are desirably separated from the water vapor.

After the coke drum has been filled to a desired level, stripping steam at a high temperature and pressure is injected into the coking drum through a line 60 to strip volatile hydrocarbon components from the petroleum coke. The stream of stripped hydrocarbon materials and steam is passed to fractionator 10 where the heavier hydrocarbon materials are recovered and the steam and light hydrocarbons are passed to further treatment. After the stripping steam has removed a major portion of the volatile components from the petroleum coke, the coke is further cooled with additional steam supplied through line 60 for about one-half hour or until a suitably reduced temperature in the petroleum coke has been achieved. The petroleum coke is then cooled with water also supplied through line 60 to a temperature of about 200° F. The cooling steam is passed from coke drum 30 through line 34, valve 40, line 42, valve 46 and line 50 to a blow-down drum 52 where water and light hydrocarbons are recovered from the mixture through a line 54 and passed to further processing and heavier hydrocarbons are recovered through a line 56 and passed to further processing, for instance in fractionator 10 or the like.

After the petroleum coke has been cooled to a suitable temperature, the injection of water is stopped and a top header 74 and a bottom header 76 are removed. The removal of these headers, especially the lower header, are operations that require care to ensure adequate safety for the operating personnel. When the top header is removed, quantities of steam and the like may be emitted. When bottom header 76 is removed, not only may quantities of steam be emitted but quantities of water which have been held up in coke drum 30 may be released along with possibly small quantities of coke. This hot water, hot steam and hot particles can be very hazardous to operating personnel. As a result the removal of bottom header 76 is generally accomplished by releasing the header and lowering it onto a header cart (not shown) which is used to move the header away from the bottom of coke drum 30. Thereafter, a bottom header 76 is removed and a pilot hole 90 (shown in FIG. 2) is cut through the coke by a high-pressure water jet mounted on a drillstem (not shown) through the center of the coke in drum 30. The drillstem is then retracted and thereafter the remaining coke in the drum is cut from the drum using high-pressure water jets which are also mounted on the drillstem. The removed coke falls through the pilot hole into a sump beneath coke drum 30 for recovery.

The top of a typical coking drum is shown in FIG. 3 and includes a flange 92, a top header 74 and an outlet line 94. Coke is generally accumulated in drum 30 to a desired height well below the top of the drum so that operating room is available for steaming, drilling the pilot hole and the like. Top header 74, as indicated, is removed when it is desired to remove the coke from the drum.

The operation of a petroleum coking process as described above is considered to be known to those skilled in the art and coking processes of this type are shown in U.S. Pat. No. 3,917,564, issued Nov. 4, 1975, to Meyers, U.S. Pat. No. 4,130,475, issued Dec. 19, 1978, to Cameron et al, U.S. Pat. No. 4,334,981, issued Jun. 15, 1982 to Holloway et al, U.S. Pat. No. 4,666,585, issued May 19, 1987, to Figgins et al, U.S. Pat. No. 4,874,505, issued Oct. 17, 1989, to Bartilucci et al, and U.S. Pat. No. 4,968,407, issued Nov. 6, 1990 to McGrath et al. These patents show coking processes including various modifications and variations thereof and are hereby incorporated in their entirety by reference.

The opening in the bottom of coke drum 30 is typically about ten to twelve feet in diameter as opposed to the opening in the top of the coke drum which is typically about three to four feet in diameter. As a result, there is a tendency in some instances, when the bottom header is removed, for the coke in drum 30 to sag or slump through the opening in the bottom of the coke drum, thereby resulting in difficulty in removing the bottom header from beneath coke drum 30. This results in a dangerous manual operation to chip the coke away to permit the removal of the bottom header and the like. As a result, a continuing effort has been directed to the development of a method for preventing slumping of the coke in coke drum 30 upon removal of bottom header 76.

SUMMARY OF THE INVENTION

According to the present invention, slumping of the petroleum coke in a petroleum coking drum is reduced by the use of a petroleum coking drum comprising a) a generally cylindrical vessel having a principal diameter portion, an upper reduced diameter portion at an upper end of the vessel, an upper reducing diameter portion extending from a lower end of the upper reduced diameter portion to an upper end of the principal diameter portion, a lower reduced diameter portion at a lower end of the vessel and a lower reducing diameter portion extending from an upper end of the lower reduced diameter portion to a lower end of the principal diameter portion; b) a top head removably positionable to close the upper reduced diameter portion; c) a bottom head removably positionable to close the lower reduced diameter portion; and d) a plurality of restraining bars positioned around an inner circumference of the lower reduced diameter portion.

Restraining bars may also be positioned on the lower reducing diameter portion or on both the reducing diameter portion and the reduced diameter portion of the walls of the petroleum coking drum.

DESCRIPTION OF PREFERRED EMBODIMENTS

In the description of preferred embodiments, the same numbers will be used throughout to refer to the same or similar components in all of the Figures. Pumps, conveyors and the like necessary to accomplish the indicated flows have not been shown since such are considered to be well-known to those skilled in the art.

Figure 1:
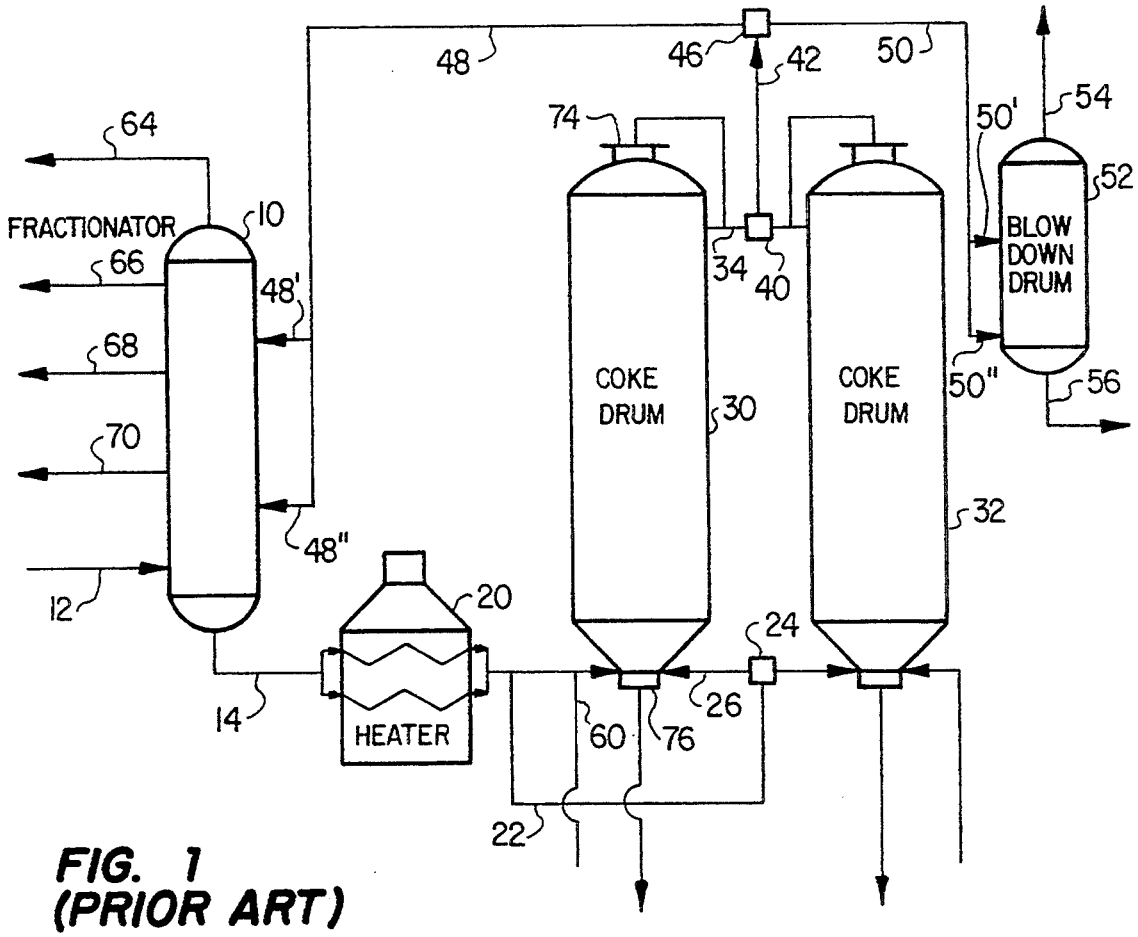
FIG. 1 (PRIOR ART)
FIG. 1 is a schematic diagram of a prior art petroleum coking process.
Figure 2:
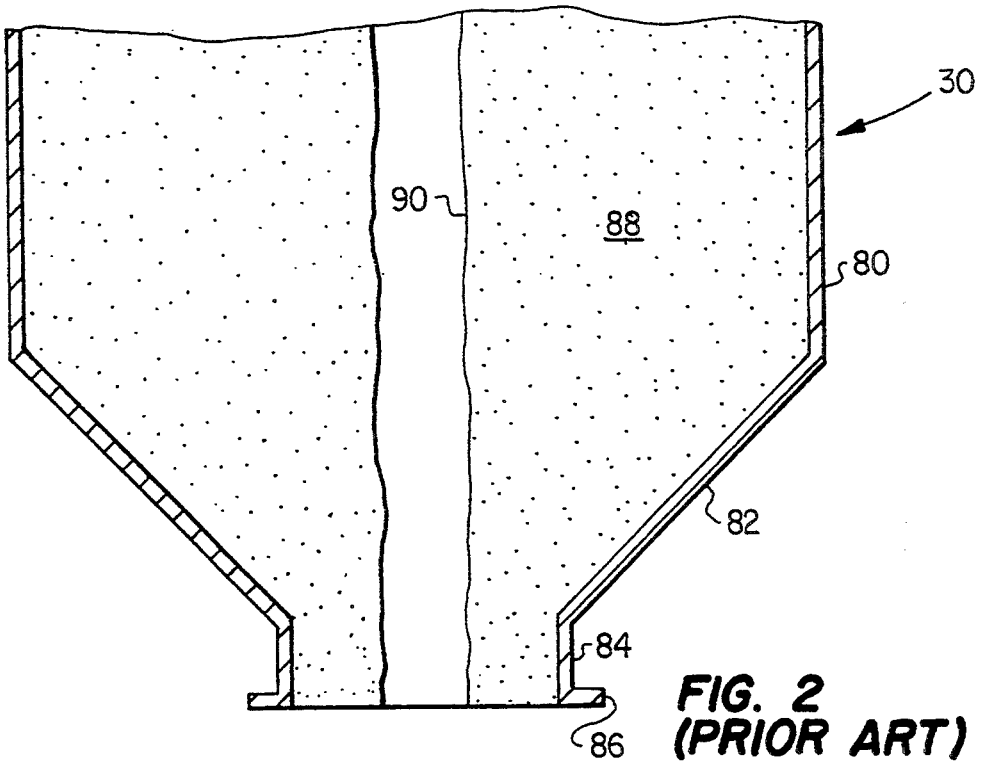
FIG. 2 (PRIOR ART)
FIG. 2 is a schematic diagram of the lower portion of a coking drum containing petroleum coke and including a pilot hole as known to the prior art.
Figure 3:
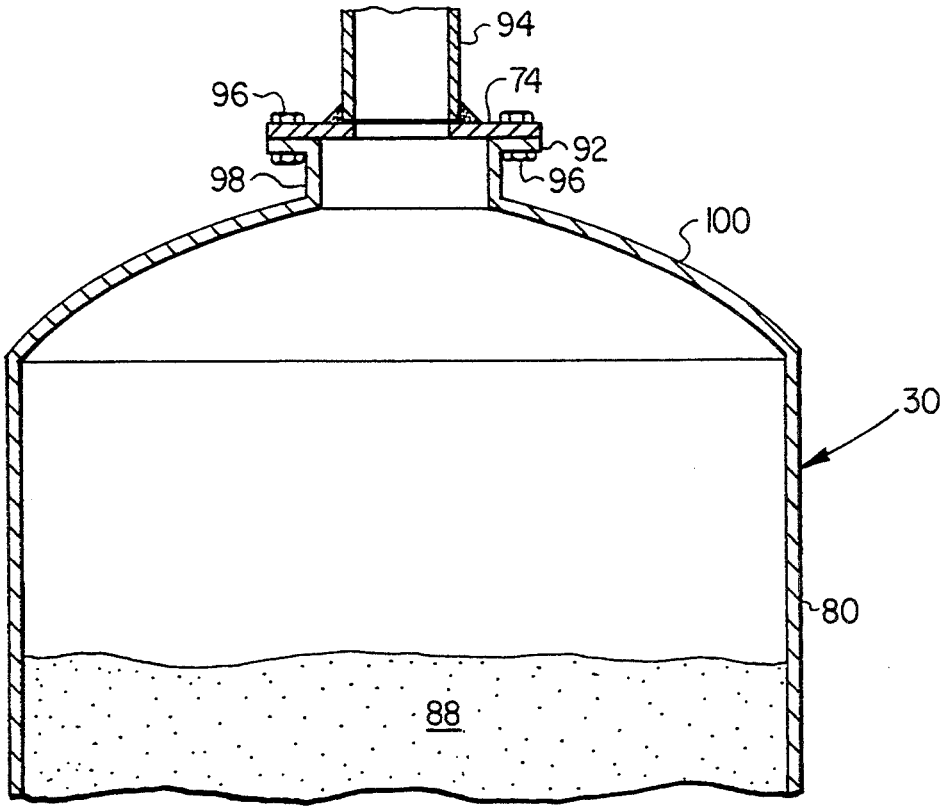
FIG. 3 (PRIOR ART)
FIG. 3 is a schematic diagram of the top portion of a petroleum coking drum as known to the prior art.

In FIG. 3, a top portion of coke drum 30 is shown. Coke drum 30 comprises a relatively long central section having a principal diameter 80 which is typically from about twenty-five to about thirty feet. Such coke drums may be from about sixty-five to ninety-five feet in height and are operated as discussed previously. At the top of drum 30, a reducing diameter portion 100 extends from principal diameter 80 to a reduced diameter portion 98. Reduced diameter portion 98 at the top of a typical coking drum 30 is about three to four feet in diameter. Top header 74 comprises a flange which is fixed to a flange 92 positioned on an upper end of reduced diameter portion 98. The flanges are held together during normal operations by bolts 96. A line 94 is positioned through top header 72 to permit the recovery of hydrocarbon vapors, steam, water and the like as necessary from coking drum 30 during operations. This construction is considered typical of petroleum coking drums used in the industry.

Figure 4:
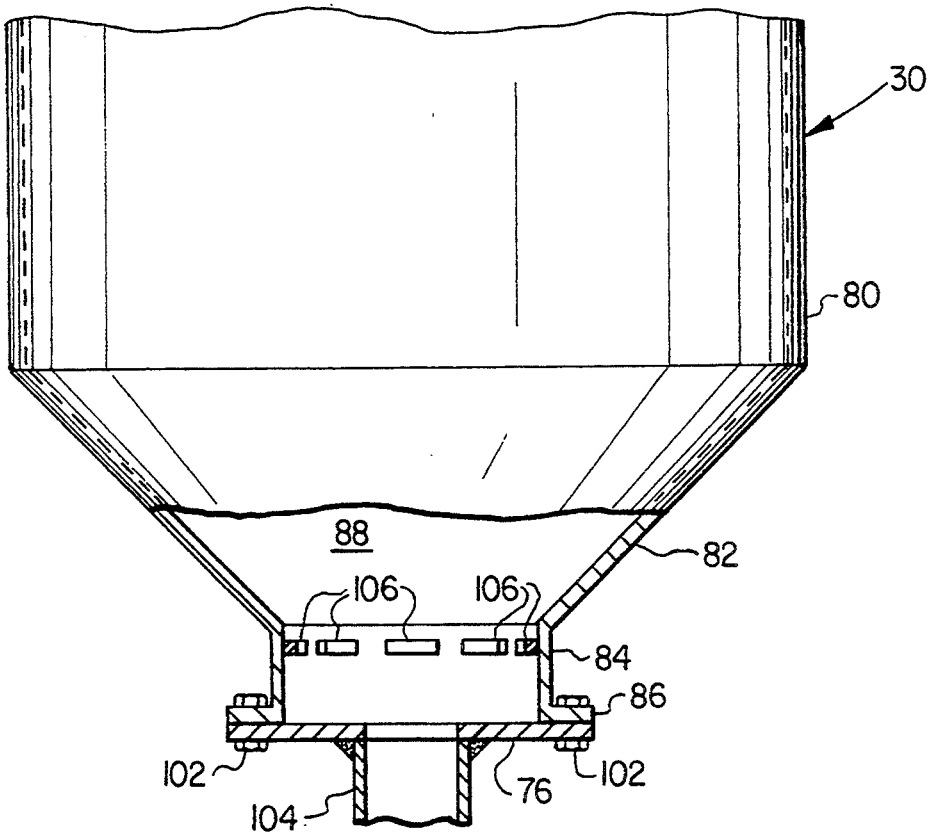
FIG. 4 is a schematic diagram of the lower portion of a petroleum coking drum including an embodiment of the present invention.

FIG. 4 shows a bottom portion of coking drum 30 and a lower portion of principal diameter 80. At the bottom of drum 30, a lower reducing diameter portion 82 which extends from principal diameter 80 to a reduced diameter portion 84 which terminates at a flange 86 which, during normal operation, is bolted by bolts 102 to bottom header 76. Bottom header 76 is maintained in substantially sealing engagement with flange 86 and includes a line 104 for the introduction of the heavy petroleum residuum, steam and water. The drum, as shown, is filled with coke. A break-out section has been shown to show restraining bars 106 which are positioned about the inside circumference of reduced diameter section 84. As discussed previously, when bottom header 76 is removed from the bottom of coke drum 30, the coke in the drum tends to slump and sag through reduced diameter portion 84. This can result in continued contact of the petroleum coke with bottom header 76 even when it has been lowered to its position for withdrawal on the supporting cart. It is necessary in such instances to manually chip away the coke until no further sagging occurs and the coke is no longer in contact with bottom header 76 so the cart can be removed. This slumping or sagging occurs partly as a result of the coke's flexibly deforming through the opening and partly by sliding of the coke along the inner surfaces of reducing diameter section 82 and reduced diameter section 84.

This slumping is reduced by the use of restraining bars 106 which are positioned around the inner circumference of reduced diameter section 84. Restraining bars 106 are typically less than about four inches in height as measured in a direction perpendicular to the surface upon which they are positioned. They are desirably from about one-half inch to four inches in height. Restraining bars 106 are less than about four inches in width when measured along a line parallel to the surface upon which they are mounted and preferably are from about one-half to about four inches in width. While one or more continuous circles of material could be used as a restraining bar, such is considered to be undesirable. Desirably, the restraining bars are no more than about two feet in length and desirably are from about four inches to about one foot in length. In the event that a continuous band of material is used, the band can cause operating difficulties if it becomes loosened around part of its diameter since it can then deform and sag beneath the bottom of reduced diameter portion 84, thus necessitating an interruption of operations while the band is removed or repaired. Alternatively, if one or more of the restraining bars having a shorter length is loosened, it can fall from coke drum 30 with the coke resulting in minimal interruption of operations. A plurality of restraining bars 106 are positioned generally circumferentially around reduced diameter portion 84 to prevent slumping as discussed above. The restraining bars can be of any suitable material which is compatible with the materials of construction of the coking drum which is generally constructed of 310 or 410 stainless steel, or cladded carbon steel. The restraining bars can be of generally any shape such as square, rectangular, cylindrical, circular or the like so long as a protrusion into the inner diameter of reduced diameter portion 84 is accomplished. Preferably, the restraining bars are of rectangular or square shape so that square corners are provided to engage the coke.

Figure 5:
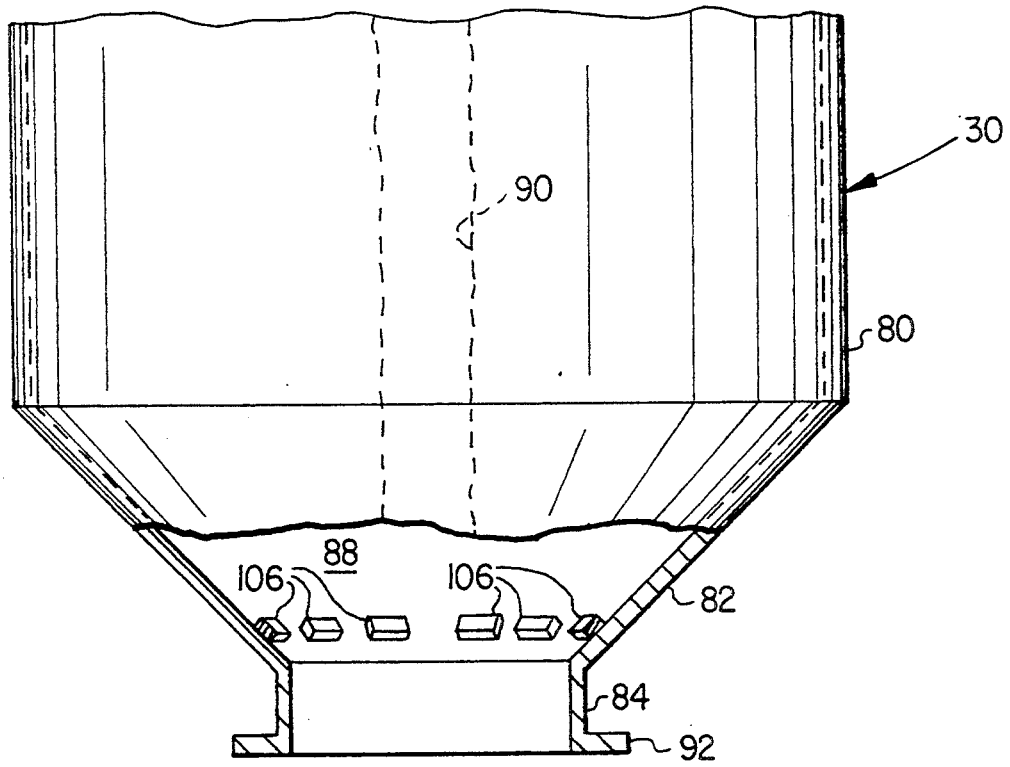
FIG. 5 is a schematic diagram of the lower portion of a coking drum including an alternate embodiment of the present invention.

In FIG. 5, an alternate embodiment of the present invention is shown which includes restraining bars positioned on the inner circumference of reducing diameter portion 82. While restraining bars have been shown only on the lower portion of reducing diameter portion 82, it should be clearly understood that these bars can be positioned over substantially the entire surface of reducing diameter portion 82, if desired.

Figure 6:
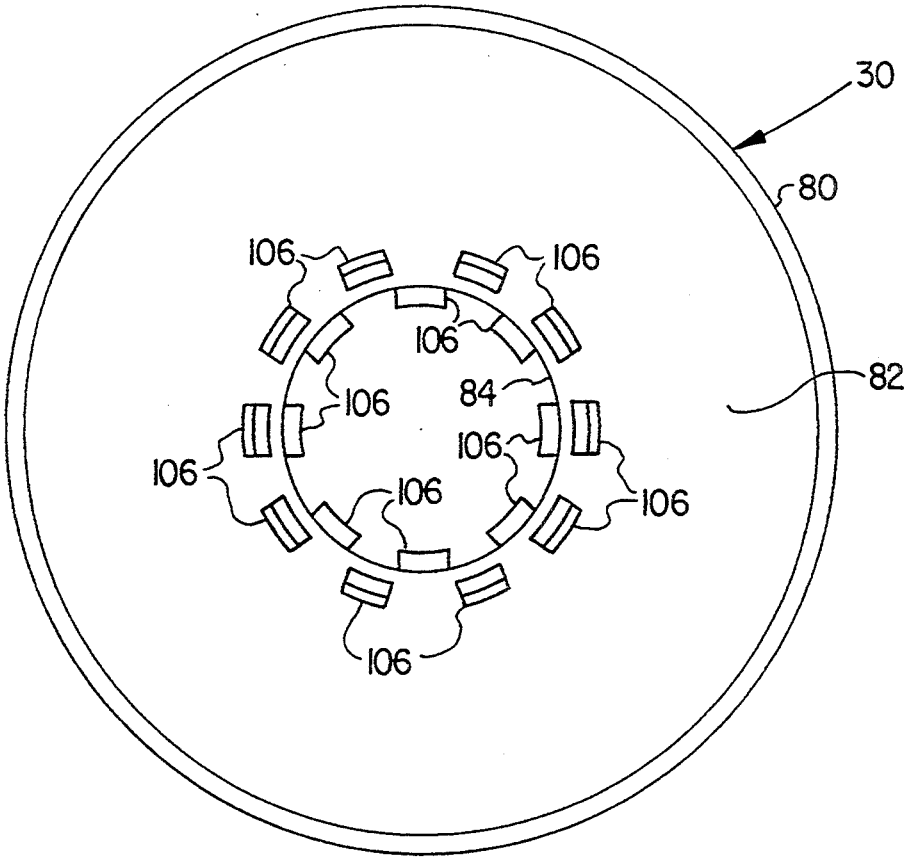
FIG. 6 is a top schematic view of the bottom portion of a petroleum coking drum including a further embodiment of the present invention.

In FIG. 6, a top view of coke drum 30 is shown. In this embodiment, restraining bars 106 are positioned on both the inner circumference of reducing diameter portion 82 and the inner circumference of reduced diameter portion 84.

The restraining bars may be positioned randomly or in a selected pattern on the inner circumference of either reducing diameter portion 82 or reduced diameter portion 84, although it is preferred that the restraining bars be spaced generally around the entire circumference.

The use of restraining bars as described above results in reduced slumping of petroleum coke when bottom header 76 is removed. Notwithstanding the reduction in coke slumpage, minimal or no restriction in the coke recovery process results. During drilling of the pilot hole, the restraining bars offer no additional restriction to that normally encountered to the removal of dislodged petroleum coke through the pilot hole. Similarly, during the recovery of the larger body of coke outside the pilot hole, the predominant method of discharge of recovered petroleum coke is via the pilot hole and no contact is had with the restraining bars. During the recovery of the last portions of the petroleum coke from reducing diameter portion 84, the petroleum coke is dislodged and readily passes through reduced diameter portion 84. Thus, the use of the restraining bars has resulted in reducing the slumping of coke, thereby avoiding the necessity for an inherently hazardous operation with no detriment to the recovery of petroleum coke from the petroleum coking drum.

Having thus described the invention by reference to certain of its preferred embodiments, it is pointed out that the embodiments described are illustrative rather than limiting in nature and that many variations and modifications within the scope of the present invention may be considered obvious and desirable by those skilled in the art based upon the foregoing description of preferred embodiments.

Having thus described the invention, we claim:

1. A petroleum coking drum comprising:

a) a generally cylindrical vessel having a principal diameter portion, an upper reduced diameter portion at an upper end of said vessel, an upper reducing diameter portion extending from a lower end of said upper reduced diameter portion to an upper end of said principal diameter portion, a lower reduced diameter portion at a lower end of said vessel and a lower reducing diameter portion extending from an upper end of said lower reduced diameter portion to a lower end of said principal diameter portion;

b) a top head removable positionable to close said upper reduced diameter portion;

c) a bottom head removable positionable to close said lower reduced diameter portion; and d) a plurality of restraining bars positioned around an inner circumference of said lower reduced diameter portion.

2. The drum of claim 1 wherein said restraining bars are less than about 4 inches in height.

3. The drum of claim 2 wherein said restraining bars are from about 0.5 to about 4 inches in height.

4. The drum of claim 1 wherein said restraining bars are less than about 4 inches wide.

5. The drum of claim 4 wherein said bars are from about 0.5 to about 4 inches wide.

6. The drum of claim 1 wherein said restraining bars are less than 2 feet in length.

7. A petroleum coking drum comprising:

a) a generally cylindrical vessel having a principal diameter portion, an upper reduced diameter portion at an upper end of said vessel, an upper reducing diameter portion extending from a lower end of said upper reduced diameter portion to an upper end of said principal diameter portion, a lower reduced diameter portion at a lower end of said vessel and a lower reducing diameter portion extending from an upper end of said lower reduced diameter portion to a lower end of said principal diameter portion;

b) a top head removable positionable to close said upper reduced diameter portion;

c) a bottom head removable positionable to close said lower reduced diameter portion; and d) a plurality of restraining bars positioned around an inner circumference of said lower reducing diameter portion.

8. The drum of claim 7 wherein said restraining bars are less than about 4 inches in height.

9. The drum of claim 8 wherein said restraining bars are from about 0.5 to about 4 inches in height.

10. The drum of claim 7 wherein said restraining bars are less than about 4 inches wide.

11. The drum of claim 10 wherein said bars are from about 0.5 to about 4 inches wide.

12. The drum of claim 7 wherein said restraining bars are less than 2 feet in length.

13. A petroleum coking drum comprising:

a) a generally cylindrical vessel having a principal diameter portion, an upper reduced diameter portion at an upper end of said vessel, an upper reducing diameter portion extending from a lower end of said upper reduced diameter portion to an upper end of said principal diameter portion, a lower reduced diameter portion at a lower end of said vessel and a lower reducing diameter portion extending from an upper end of said lower reduced diameter portion to a lower end of said principal diameter portion;

b) a top head removable positionable to close said upper reduced diameter portion;

c) a bottom head removable positionable to close said lower reduced diameter portion; and d) a plurality of restraining bars positioned around an inner circumference of said lower reduced diameter portion and an inner circumference of said lower reducing diameter portion.

14. The drum of claim 13 wherein said restraining bars are less than about 4 inches in height.

15. The drum of claim 14 wherein said restraining bars are from about 0.5 to about 4 inches in height.

16. The drum of claim 13 wherein said restraining bars are less than about 4 inches wide.

17. The drum of claim 16 wherein said bars are from about 0.5 to about 4 inches wide.

18. The drum of claim 13 wherein said restraining bars are less than 2 feet in length.

* * * * *